United States Patent
Boutaghou et al.

(10) Patent No.: US 6,381,098 B1
(45) Date of Patent: Apr. 30, 2002

(54) LASER TEXTURED TRANSDUCING HEAD SLIDER

(75) Inventors: Zine-Eddine Boutaghou, Vadnais Heights; Mark J. Schaenzer, Eagan, both of MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/136,076

(22) Filed: Aug. 18, 1998

Related U.S. Application Data (60) Provisional application No. 60/055,941, filed on Aug. 18, 1997.

(51) Int. Cl.$^7$ ............................................. G11B 17/32
(52) U.S. Cl. .................................................. 360/235.2
(58) Field of Search ........................ 360/235.2, 235.3, 360/235.4, 235.8, 235.9

(56) References Cited

U.S. PATENT DOCUMENTS

| | | | | |
|---|---|---|---|---|
| 5,231,613 A | * | 7/1993 | Nakayama et al. | 360/235.2 |
| 5,386,400 A | * | 1/1995 | Nakayama et al. | 360/235.2 |
| 5,768,055 A | * | 6/1998 | Tian et al. | 360/235.2 |
| 5,774,303 A | * | 6/1998 | Teng et al. | 360/235.2 |
| 5,841,608 A | * | 11/1998 | Kasamatsu et al. | 360/235.2 |

OTHER PUBLICATIONS

"Stiction Free Slider for the Smooth Surface Disk", Y. Kasamatsu, et al., IEEE Transactions on Magnetics, vol. 31. No. 6, Nov. 1995, pp. 2961–2963.

* cited by examiner

*Primary Examiner*—Allen Cao
(74) *Attorney, Agent, or Firm*—Larkin, Hoffman, Daly & Lindgren, Ltd.; Frederick W. Niebuhr, Esq.

(57) ABSTRACT

A magnetic data transducing slider is selectively textured, at least over its air bearing surface, to provide rounded nodules or rims adapted to support the normally aerodynamically supported slider when at rest on a specular surface of a data recording medium. The texturing substantially reduces the area of contiguous slider/medium contact as compared to the area of the air bearing surface, counteracting stiction and substantially reducing dynamic friction during head takeoffs and landings. Slider texturing eliminates the need for a dedicated contact or landing zone on the data recording medium, making more space available for storing data on the medium, and insuring a more uniform surface roughness over the entire surface of a medium that confronts the slider. The desired texture is formed according to a process that includes depositing chromium or another metal onto the slider substrate to provide metallic regions on the air bearing surface, particularly along opposite skis of the slider. Then, laser energy is concentrated upon the regions to form smooth, rounded support features, such as nodules or annular rims. The features can be uniform in size, or alternatively can exhibit a size gradient to support the slider at an incline that replicates its orientation when aerodynamically supported.

34 Claims, 6 Drawing Sheets

LASER TEXTURED TRANSDUCING HEAD SLIDER

This application claims the benefit of Provisional Application No. 60/055,941 entitled "Laser Texture Disc Slider for Increased Data Storage and Improved Tribology" filed Aug. 18, 1997.

BACKGROUND OF THE INVENTION

The present invention relates to magnetic data transducing head sliders of the type supported aerodynamically during operation of a disk drive, and more particularly to a design for such a slider to reduce slider/disk friction and stiction, and support the slider in a desired orientation when in contact with a data storage disk.

In typical magnetic data storage devices, magnetic disks with flat recording surfaces are mounted rotatably, and magnetic data transducing heads are positioned in close proximity to the recording surfaces of the disks. Each transducing head is movable generally radially with respect to its associated disk. In higher capacity devices, the disks are rotated at high speeds to create an air cushion or bearing that supports each transducing head at a controlled distance from its associated recording surface. The transducing heads contact their associated disks only when the disks are either stationary, accelerating from a stop, or decelerating to a complete stop. In some drives, the accelerations and decelerations occur at power-up and power-down respectively, while in other drives the disks may undergo a deceleration and acceleration between two successive data operations. In either event, there is a need to support the transducing head slider at rest upon the associated recording surface.

Designers of magnetic disks continually strive to increase the density at which the magnetic data can be stored. One factor that limits storage densities is the transducing head flying height, i.e. its distance from the recording surface when supported by the air bearing. As discrete data storage areas are placed more closely to one another, the transistor must "fly" closer to the recording surface to distinguish between adjacent storage areas. In recent years, transducing head flying heights have been decreased from levels greater than about 10 microinches to levels of about 2 microinches. Flying heights of about 1.5 microinches and less are under consideration. These lower flying heights have been achieved largely due to improved techniques for reducing media surface roughness. However, the transducing head sliders exhibit a tendency to adhere to the extremely smooth media surfaces, a problem frequently referred to as "stiction" that can perturb the slider during disk accelerations, and in some cases lead to a catastrophic head crash.

To counteract this problem, disks with super smooth recording surfaces also have been textured to provide an annular dedicated landing zone or head contact zone with greater surface roughness than the data storage areas of the disk. Laser texturing of landing zones has been found particularly effective. See, for example, U.S. Pat. No. 5,062,021 (Ranjan et al) assigned to the assignee of this application. The Ranjan patent describes using a laser to form depressions surrounded by raised rims. Alternatively, international publications No. W097/07931 and No. W097/43079 describe forming domes or nodules. In either case, multiple texturing features cooperate to provide a controlled texture pattern throughout the dedicated contact zone.

At transducing head flying height on the order 1–2 microinches, the contrast in roughness between the data storage area and the textured contact zone raises concerns, because the peaks of the contact zone may protrude into a normal operating range of slider, increasing the risk of unintended and damaging slider/disk contact. Short of actual physical contact, a transducing head flying near the interface of the data zone and the textured zone may be perturbed by a buffeting of the air bearing over the laser nodules or other features. In addition, the annular area requiring texturing is relatively large compared to the air bearing surface of the slider, and occupies an area of the disk that otherwise would be available for storage of data. Further, in drives that use media with textured contact zones, the rotary actuator or other head supporting structure must be controlled to carry the transducing head into alignment with the contact zone in response to sensed decelerations of the disk, and further controlled during accelerations to maintain the head in alignment with the contact zone until satisfactory aerodynamic support is achieved.

Accordingly, it is an object of the present invention to provide a disk drive in which a disk or other recording medium can have a substantially uniform and negligible surface roughness over an entire area confronted by an aerodynamically supported transducing head.

Another object is to provide a magnetic data transducing head slider with an air bearing surface controllably textured to enable contiguous surface contact with extremely smooth media surfaces, to selectively orient the slider with respect to the media surfaces while maintaining acceptably low levels of friction and stiction.

A further object is to provide a process for selectively texturing the air bearing surfaces of magnetic data transducing head sliders.

Yet another object is to provide a data storage device with an aerodynamically supported transducing head slider adapted for surface contact with its associated data storage medium over an entire surface of the medium to eliminate the need to guide the slider to a particular zone of that surface.

SUMMARY OF THE INVENTION

To achieve these and other objects, there is provided a magnetic data transducing head slider, including a ceramic substrate body defining a generally planar air bearing surface having a nominal surface plane. A plurality of features are projected outwardly of the nominal surface plane. Collectively, the features are adapted to support the substrate body on a magnetic data storage medium with the air bearing surface in spaced apart relation to the data storage medium. The features are rounded and substantially free of sharp edges.

Such features are particularly well adapted for supporting the ceramic substrate body on an extremely smooth and planar recording surface of a data storage medium. The features substantially reduce the area of slider/medium contiguous surface engagement, to counteract stiction and considerably reduce dynamic friction during accelerations and decelerations of the storage medium with respect to the slider.

As can be appreciated by considering the aforementioned U.S. Pat. No. 5,108,781 and international publications No. W097/0793 1 and No. W097/43079, the selectively textured transducing head slider affords advantages similar to those achieved by selectively texturing data storage media to provide dedicated landing or contact zones. When transducing head sliders rather than media are textured, several further advantages arise. One is a substantial reduction in the required area that needs texturing, in particular the air bearing surface of the slider or a portion of the air bearing surface, as opposed to a contact zone's complete circumferential extension and width at least equal to that of the slider. Texturing the slider eliminates the need for a contact zone on the disk or other data storage medium. As a result, additional surface area is available for storing data. Also, because the slider can come to rest against the medium virtually anywhere along the recording surface. There is no need to carry the slider to a landing zone or any other required location when decelerating the medium. Likewise, there is no need to maintain the slider aligned with a particular zone of the medium when accelerating the medium.

According to another aspect of the present invention, the slider supporting features are formed by a process for treating a ceramic substrate body of a magnetic data transducing head slider, including the following steps:

a. providing a ceramic substrate body having a substantially planar air bearing surface defining a nominal surface plane;

b. applying a heat-formable material to the ceramic substrate body along the air bearing surface; and c. concentrating coherent energy at selected locations along the heat-formable material, forming at each selected location a feature of the material that projects outwardly beyond the nominal surface plane.

The features can be formed with a substantially uniform height or degree of projection beyond the nominal surface plane. As a result the features cooperate to support the ceramic substrate body with the nominal surface plane in substantially parallel, spaced apart relation to the recording medium. Alternatively the features can be selectively varied in size to form a height gradient in a selected direction across the slider. For example, larger features can be formed near a forward edge of a slider that supports a magnetic data transducer along its trailing edge. Then, the features support the slider with the nominal surface plane slightly inclined away from the data storage medium in the forward direction. More particularly, the slider body can be supported in an inclined orientation selected to simulate the in-flight orientation in which the air bearing supports the slider when the medium is moving relative to the slider. This reduces the tendency of the slider to experience rocking action from the transition to air bearing support that occurs during takeoffs.

The application of the heat-formable material is advantageous because concentrating laser energy on the ceramic substrate tends to ablate and/or remove material, rather than forming rims, nodules or other rounded features as desired. A metal, in particular chromium, is a highly preferred heat-formable material because of its good adhesion to the ceramic substrate material along with the formation of rounded rims or nodules when exposed to concentrated laser energy. Molybdenum, tungsten, NiFe alloys and copper are also acceptable heat-formable materials.

Under most circumstances it is preferred to utilize the heat-formable material in localized regions over the air bearing surface rather than in a continuous film entirely covering that surface. To this end, masking or etching techniques are employed to limit coverage of the heat-formable material. Further, it is advantageous to provide channels, pockets or other depressions to receive the heat-formable material, so that the outer surface of the material is substantially coincident with, or slightly recessed inwardly of, the nominal plane of the air bearing surface. Nonetheless, the chromium or other metallic regions are preferably uniform in their height or outward extent, so that any height gradient, to the extent possible, is solely the result of varying sizes of the nodules or other features.

Thus in accordance with the present invention, selective texturing of the transducing head slider, in particular over its air bearing surface, eliminates the need to provide a textured contact zone in the disk or other data storage medium. The entire slider-confronting surface of the disk can be extremely smooth, and available for storing the magnetic data. The nature of the air bearing and in-flight behavior of the slider are consistent over the entire surface increasing slider stability and reducing the risk of unintended contact with the disk. With the slider able to come to rest against the disk at any location over the recording surface, there is no need to guide the slider to any particular location before the decelerating disk comes to rest.

IN THE DRAWINGS

For a further understanding of the above features and advantages, reference is made to the following detailed description and to the drawings, in which.

DETAILED DESCRIPTION OF THE PREFERRED EMBODIMENTS

Figure 1:
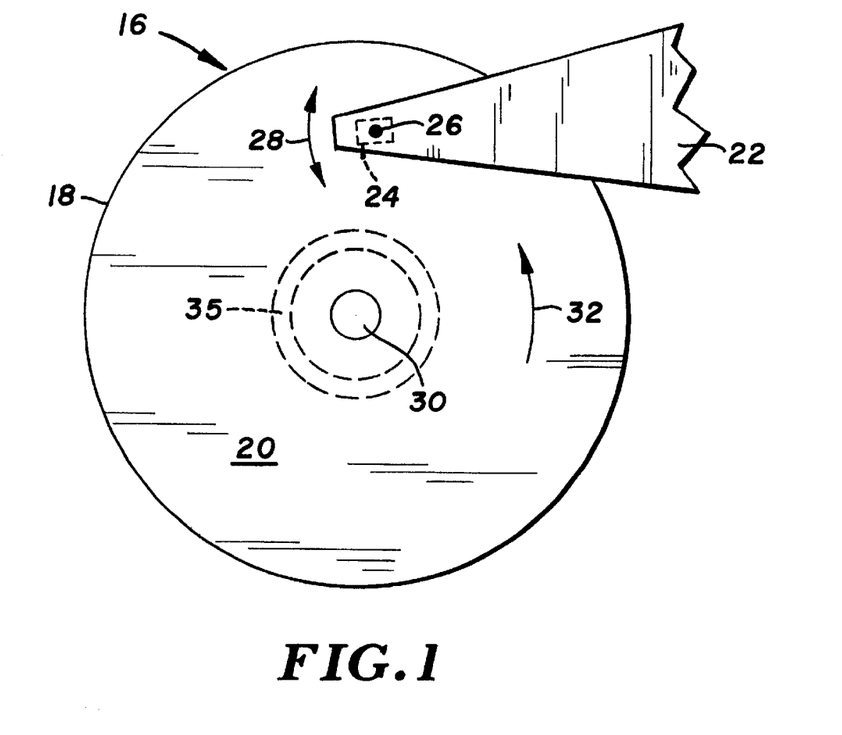
FIG. 1 is a partial schematic view of a magnetic data reading and recording device constructed in accordance with the present invention.
Figure 2:
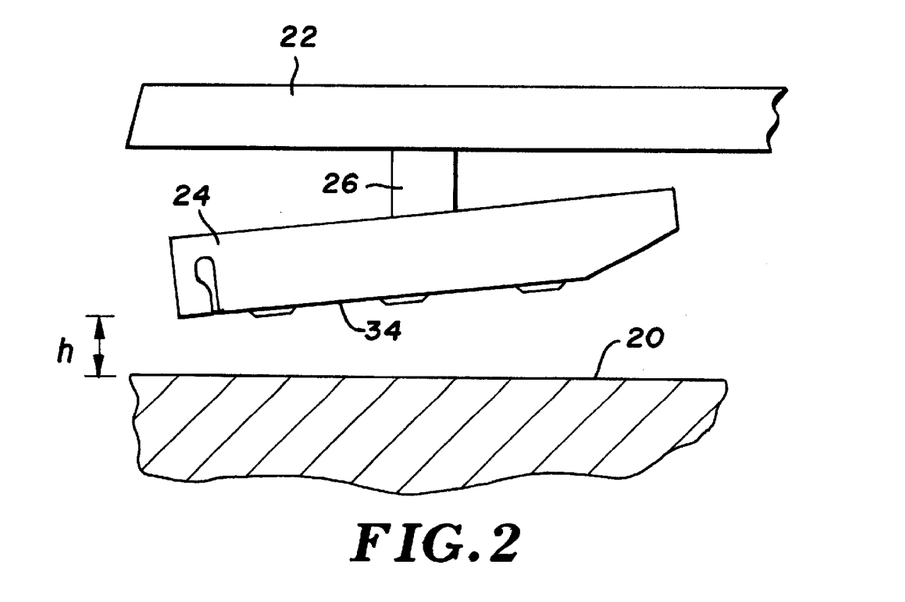
FIG. 2 is a partial schematic elevation of the device.

Turning now to the drawings, FIGS. 1 and 2 show in part a device 16 for reading, recording and storing magnetic data on a rotatable magnetic disk 18. The disk has a substantially planar, horizontal upper surface or recording surface 20. Surface 20 is specular or extremely smooth, having a surface roughness (distance between peak height and depression depth) of about 5 nm or less, more preferably less than about 2 nm. A rotary actuator includes a transducer support arm 22 supported in cantilevered fashion from a rotary actuator shaft (not shown). A magnetic data transducing head slider 24 is mounted to the tree end of support arm 22 through a suspension 26. The suspension permits a gimballing action of the slider, i.e., limited vertical travel and limited rotation about horizontal pitch and roll axes. Arm 22, when pivoted by the rotary actuator shaft, moves slider 24 in an arcuate path, generally radially with respect to disk 18 as indicated at 28.

At its center, disk 18 has an opening to accommodate a shaft 30 of a disk drive spindle operable to rotate the disk counterclockwise as indicated at 32. Rotation of the disk and pivoting of arm 22 are controlled in concert to selectively position slider 24 at desired locations along recording surface 20 for reading and recording operations. During such operations, there is no slider/disk contact. Rather, air near surface 20 travels with the rotating disk due to frictional drag, and flows between surface 20 and slider 24 to form an air bearing or cushion that supports the slider spaced apart from the recording surface.

Slider 24 is formed with an air bearing surface 34, i.e., the bottom surface as arranged in FIGS. 1 and 2. The air bearing, in cooperation with a downward load on the slider from arm 22 through suspension 26, maintains the slider at a substantially constant distance above surface 20, known as the flying height. Designated "h" in FIG. 2, the flying height is substantially constant over the normal range of disk rotational speed during reading and recording. Deceleration of disk 18 causes slider 24 to come to rest on the disk.

To achieve low slider flying heights, data surface 20 preferably is extremely smooth. However, a slider that remains in contact with an extremely smooth disk surface tends to adhere to the disk, a problem frequently referred to as "stiction." There are undesirable dynamic friction effects as well, during takeoff and landing of the slider. To counteract these problems, it is known to form an annular slider contact zone on a disk, with the broken lines at 35 in FIG. 1 illustrating a typical location for the contact zone. Typically, the surface is mechanically textured or treated with a laser to increase its surface roughness relative to the other regions on the disk, which reduces stiction and friction.

When disks are textured in this fashion, it is necessary to control arm 22 or any other slider support structure to insure that the slider contacts the disk only at points within the contact zone. In particular, when the disk is decelerated after a reading or recording operation, arm 22 would be pivoted to position the slider adjacent the contact zone, so that the slider when coming to rest would engage the contact zone. Then, when the disk was later accelerated, the arm would be controlled to maintain the slider over the contact zone until disk acceleration was sufficient to establish aerodynamic support of the slider, at which point the arm could be moved to carry the slider radially away from the contact zone.

Such contact zones, while useful in addressing simultaneously the need for low flying heights and reduced friction/stiction, have disadvantages as well. One of these is the additional media fabrication time required for texturizing. Secondly, the contact zone uses a portion of the disk surface that otherwise would be available for storing further data. The contact zone introduces a discontinuity in surface roughness at the contact zone/data zone interface, leading to turbulence in the air bearing that can destabilize the slider, increasing the risk of unintended head/disk contact.

In accordance with the present invention, disk 18 is formed without a dedicated landing or contact zone. Recording surface 20 is smooth over its entire radial expanse, and thus the radially inward region formerly needed for the contact zone is available for storing further data. The roughness of surface 20 is substantially uniform throughout, e.g. on the order of several nanometers, which tends to stabilize slider 24 and allow a reduction in the flying height. The texture desired for reducing friction and stiction, as explained in detail below, is provided over air bearing surface 34 of the slider, rather than within a contact zone. Consequently, the texturing travels with the slider, so that the slider is able to contact disk 18 at any desired location on surface 20. There is no need for a slider position control function to insure that the slider assumes any particular radial position when at rest and during accelerations and decelerations of the disk.

Figure 3:
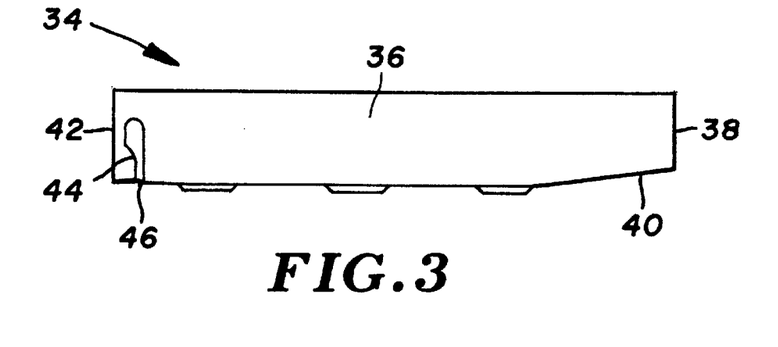
FIG. 3 is an elevation of a transducing head slider of the device in FIGS. 1 and 2.
Figure 4:
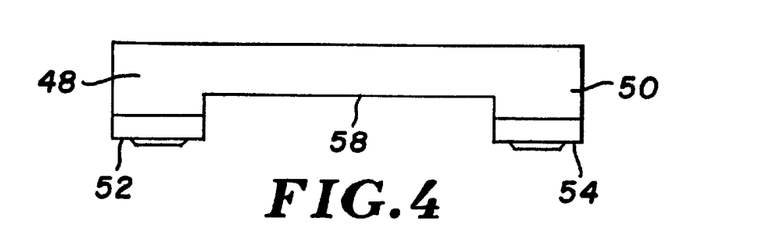
FIG. 4 is a forward end elevation of the slider.
Figure 5:
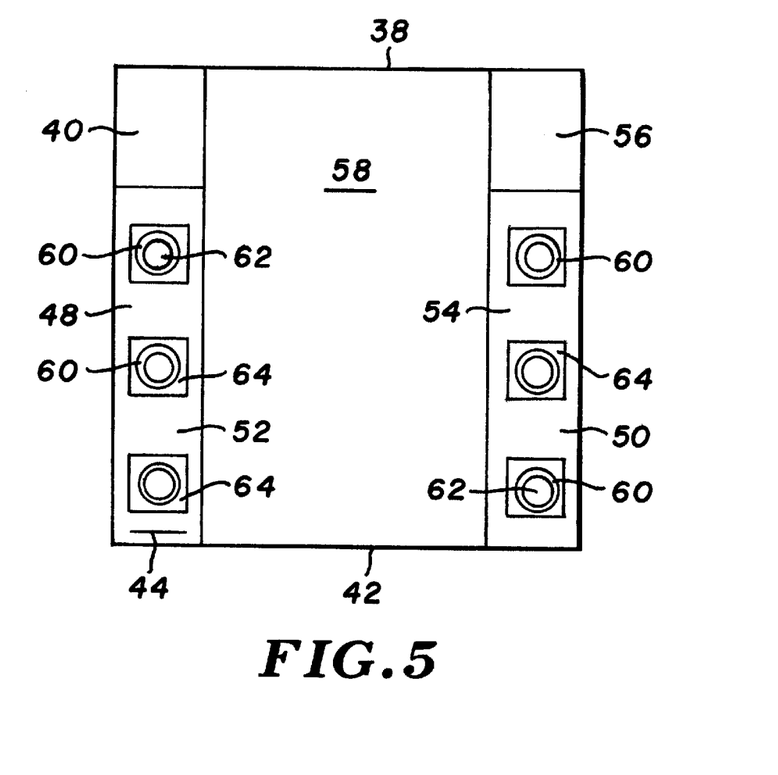
FIG. 5 is a bottom plan view of the slider.

With reference to FIGS. 3–5, transducing head slider 24 includes a substrate body 36 formed primarily of a ceramic material, e.g., a combination of alumina (aluminum oxide, $Al_2O_3$) and titanium carbide (TiC), a substantially crystalline structure. Near its leading edge 38, substrate body 36 is beveled as indicated at 40. Near a trailing edge 42 is a transducing region of the slider, including a magnetic transducer 44 substantially encapsulated in amorphous aluminum oxide, but with an exposed pole tip region 46. The distance between the pole tip region and surface 20 is the transducer flying height.

A groove is formed along the bottom of the substrate to provide two skis or rails 48 and 50 along opposite sides of the slider. Thus, the bottom of the slider has different segments occupying separate levels: the air bearing surface compromised of ski bottom surfaces 52 and 54, an inclined level including bevels 40 and 56, and a recessed region 58 forming the upper wall of the groove. Ski bottom surfaces 52 and 54 face the disk when slider 24 is aerodynamically supported. In general, surfaces 52 and 54 are planar and determine a nominal surface plane of the air bearing surface.

A plurality of slider supporting features, in particular annular rims 60, protrude outwardly, or downwardly as viewed in FIGS. 3 and 4 from ski bottom surfaces 52 and 54. With reference to FIG. 5, each of rims 60 is circular and surrounds a center depression 62. The rims have a substantially uniform height (downward extension from the nominal surface plane) in the range of about 25–75 nm, more preferably in the range of 25–40 nm. The diameter of the rims or ridges can vary, but in general is on the order of several microns.

Rims 60 are not formed of the ceramic material of the substrate body, but rather are formed of a metal. Chromium is a preferred choice for its capacity to adhere to the ceramic material and its heat-formable quality, more particularly an affinity for forming the rims, or alternatively nodules, when exposed to concentrated laser energy. With further reference to FIG. 5, chromium is selectively applied to ski bottoms 52 and 54 to form a plurality of metallic heat-formable regions 64 along the surface. When exposed to laser energy, the metal locally and rapidly melts and resolidifies to form the rims as shown.

Figure 6:
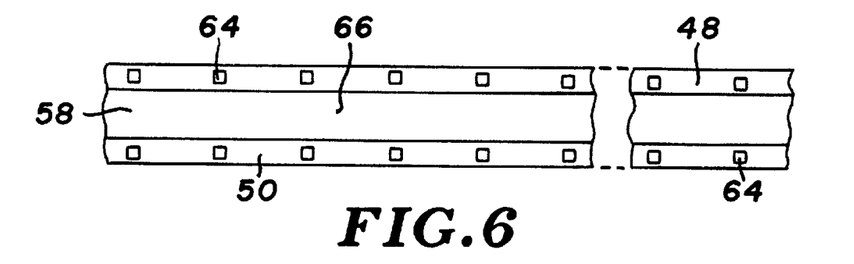
FIGS. 6–13 illustrate several stages in the fabrication of the slider.
Figure 7:
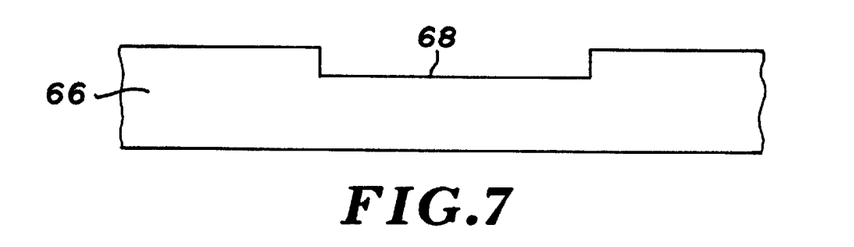

As indicated in FIG. 6, heat-formable regions 64 can be formed in opposed rows along a slider bar 66 that later is cut to provide several sliders. FIGS. 7–13 and 15 illustrate successive stages of fabricating a textured slider according to the present invention. Although these figures illustrate just one chromium region, it is to be appreciated that multiple regions on a slider as shown in FIG. 5 or on a slider bar as shown in FIG. 6 are formed simultaneously.

The initial fabrication stage is the formation of a pattern of pockets or channels, one of which is shown at 68, preferably using a photolithography or ion milling process. In particular, a photolithography pattern is masked onto the slider array. Then, the unprotected regions of the slider body are ion etched, preferably to a depth of about 1.2 microns. The result is the formation of multiple pockets or channels 68. The depth of the pockets or channels is controllable within a sub-micron range.

Figure 8:
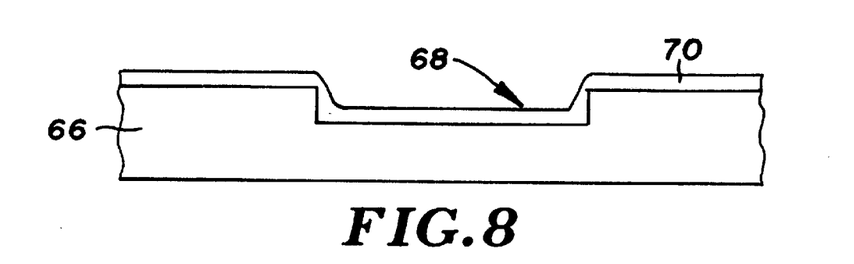

Next, chromium is applied by a vacuum deposition to a desired thickness, for example about one micron, to provide a seed layer 70 over the entire surface of the slider or slider bar, as indicated in FIG. 8. Suitable substitutes for chromium include molybdenum, NiFe alloys, copper, and tungsten. The thickness of seed layer 70 is susceptible to extremely fine control, i.e., in the range of nanometers or Angstroms.

Figure 9:
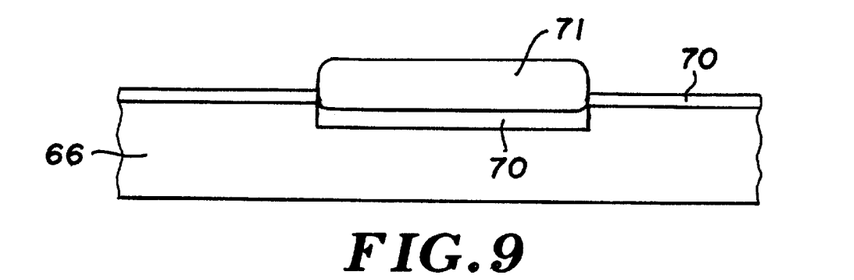
Figure 10:
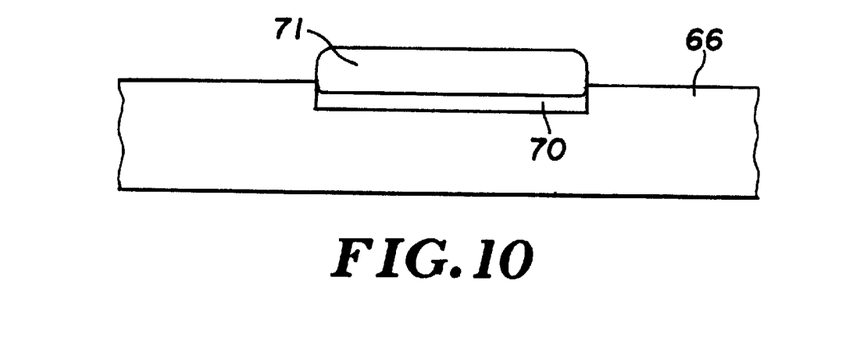
Figure 11:
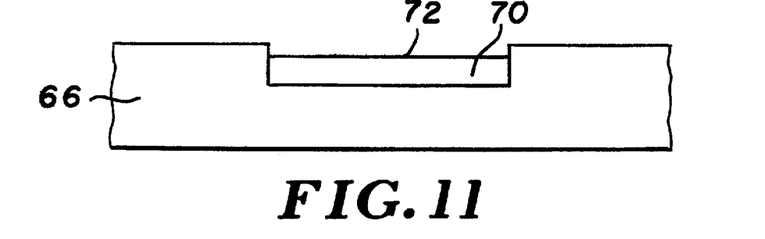
Figure 12:
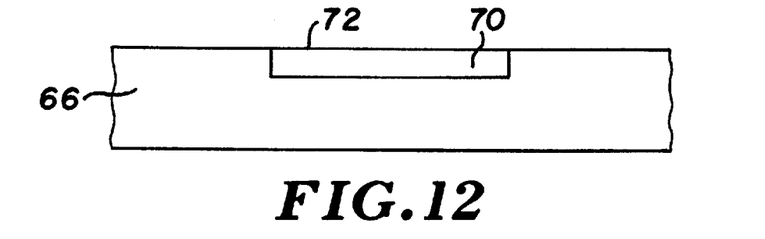
Figure 13:
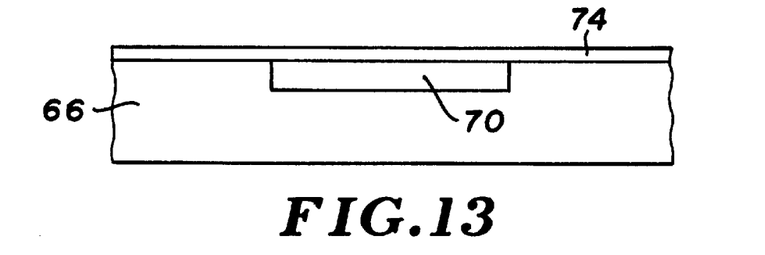

The metal layer preferably is removed from the majority of the slider. To this end, a reverse polarity photo-resist or a reverse image mask 71 is applied over seed layer 70 to protect the portions of the seed layer in the channels or pockets, as seen in FIG. 9. Then, the unprotected portions of the seed layer are removed by etching, with the result shown in FIG. 10. Subsequent removal of the photo-resist leaves regions of the seed layer recessed within the pockets or channels, as shown in FIG. 11. This is followed by a crown lapping stage in which ceramic material is removed from the substrate, closing the gap between the substrate surface and the exposed surface 72 of the chromium seed layer. The result is shown in FIG. 12, where exposed surface 72 either is coplanar with the substrate surface or remains recessed a distance of at most several nanometers.

Next, a mask 74 is applied over the substrate and remaining seed layer (FIG. 13), along opposite side regions of slider bar 66. Then, the slider bar is etched to provide a groove, thus forming skis 48 and 50 and recessed surface region 58 as shown in FIG. 5, but over the full length of slider bar rather than just one slider.

Figure 14:
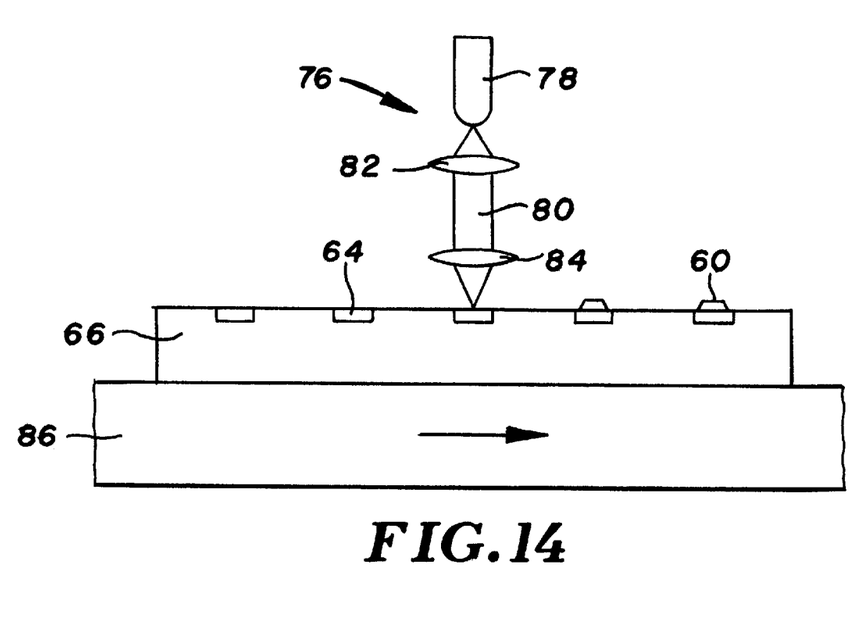
FIG. 14 schematically illustrates a texturing apparatus used in the process.

After mask 74 is removed, rims 60 are formed by selectively heating metal regions 64. FIG. 14 schematically illustrates an apparatus 76 for forming rims 60. The apparatus includes a laser 78 such as a Helium-Neon laser or Nd:YAG diode laser, for generating a coherent energy beam 80. Beam 80 is shaped by a collimating lens 82 and focused onto slider bar 66 by a focusing lens 84. A support stage 86 is movable linearly in the direction indicated by the arrow, to translate the slider bar during firing of the laser. The laser is operated in a pulsed mode. Preferably, support stage 86 is translated at a constant linear velocity and the timing between successive pulses of the laser is constant, yielding a uniform linear spacing between successive rims. The duration of each pulse is substantially instantaneous, on the order or nanoseconds. Consequently, although the slider bar is moving at a constant velocity during rim formation, the point of beam impingement in connection with forming each rim can be considered stationary. A variety of factors influence the size and shape of the rims, including the power to the laser, the duration of each pulse, and the degree to which beam 80 is focused. The optimal settings can vary from one apparatus to another, but in general are similar to the ranges of settings used for texturing media. On a larger scale, the velocity of stage 86 and timing between successive pulses can be varied to alter the spacing between successive rims. For further detail regarding rims 60 and their formation, reference is made to the aforementioned U.S. Pat. No. 5,108,781.

Figure 15:
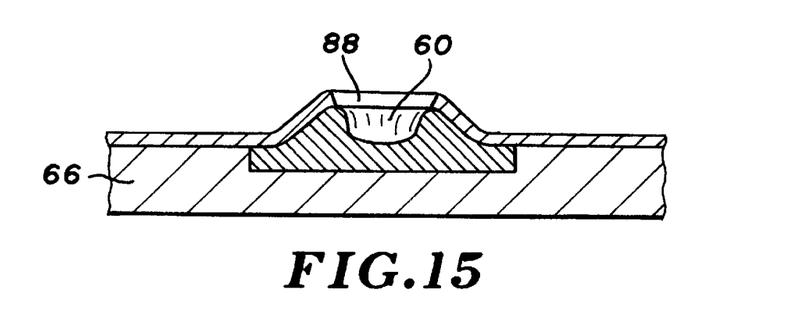
FIG. 15 illustrates another fabrication stage.

FIG. 15 illustrates the result of a final processing step, namely the deposition of a diamond-like carbon coating onto the surface, covering the substrate and the metallic regions and rims. Carbon coating 88 is applied at a substantially uniform thickness, so that the exposed surface of the carbon layer replicates the typography of the underlying substrate and metallic regions. The substrate, metallic region and coating are shown in section to illustrate the smooth, rounded quality of the rims.

One advantage of the rim formation process is the flexibility as to the order of certain stages, particularly rim formation. While just described to occur at the slider bar level, the rim forming step could as well be performed at the individual slider level, or even after mounting of the slider to the head gimbal assembly. The deposition of protective carbon layer 88 can occur after the cutting of slider bar 66 into the individual sliders, and after the lapping of each slider to form beveled surfaces 40 and 56. Alternatively, layer 88 can be applied at the slider bar stage.

Figure 16:
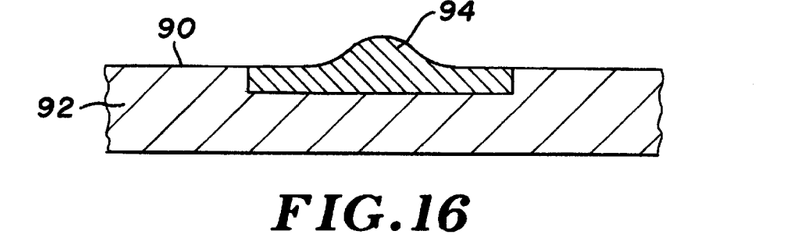
FIG. 16 illustrates alternative embodiment slider.

FIG. 16 illustrates the profile of an air bearing surface 90 of a transducing head slider 92 formed according to an alternative embodiment of the present invention. In particular, the slider support features 94 take the form of nodules or bumps, rather than circular rims. The precise relationship between laser operating parameters and resulting feature sizes and shapes is not fully understood. However, it has been found that reduced laser power and shorter pulse durations tend to form nodules rather than rims. In any event, nodules 94, like rims 60, can be formed of different heights and diameters by varying the aforementioned parameters.

Figure 17:
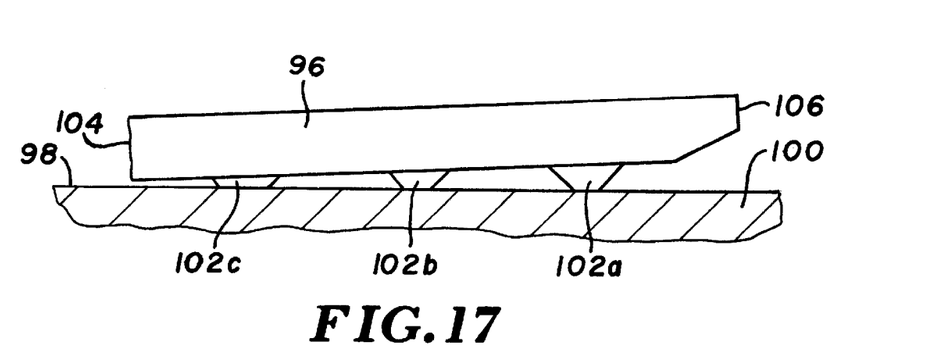
FIG. 17 illustrates an alternative embodiment slider incorporating texturing features of different sizes.

FIG. 17 is a side elevation of another alternative embodiment transducing head slider 96, shown at rest on a specular surface 98 of a magnetic disk 100. When at rest, slider 96 is supported by circular rims 102 formed with progressively increasing heights in the direction from a trailing edge 104 to a leading edge 106 of the slider. As an example, a lead rim 102a has a height (actually, a downward extension from a nominal surface plane of the air bearing surface) of about 75 nm. The heights of intermediate rim 102b and trailing edge rim 102c are about 50 nm and 25 nm, respectively. As a result, the nominal surface plane is supported at an incline with respect to surface 98 of the disk. Preferably, the incline is selected to coincide with the incline naturally assumed by slider 96 when in use, i.e., when supported by an air bearing generated by the rotating disk. The salient feature of varying rim or nodule heights in this fashion, is that the at-rest slider orientation can substantially replicate its in-flight orientation, enhancing slider stability during takeoffs and landings. Rims 102 can be of sufficient height to support a transducer on slider 96 above disk surface 98.

The incline of slider 96 is exaggerated to illustrate the principle involved. In actual practice, given the spacing between adjacent rims and the minute height difference of about 25 nm from one rim to the next, the actual angle of incline is less than about one degree.

Figure 18:
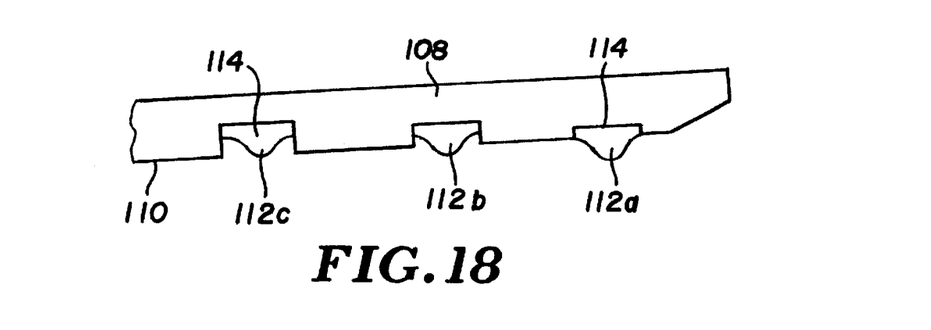
FIG. 18 illustrates another alternative embodiment slider with substantially uniformly sized texturing features positioned at different heights.

FIG. 18 illustrates another alternative embodiment transducing head slider 108, in which a gradient of rim or nodule heights is provided to support the slider at an incline when at rest on a disk surface 110. Slider 108 differs from slider 96 in FIG. 17, in that rims 112a, 112b, and 112c are the same size. The gradient is determined by varying the extent to which each metallic region 114 is recessed into its associated channel, rather than by varying nodule sizes. While allowing consistency in nodule sizes, this approach requires that the seed layer be applied in several stages, each requiring a different mask.

Figure 19:
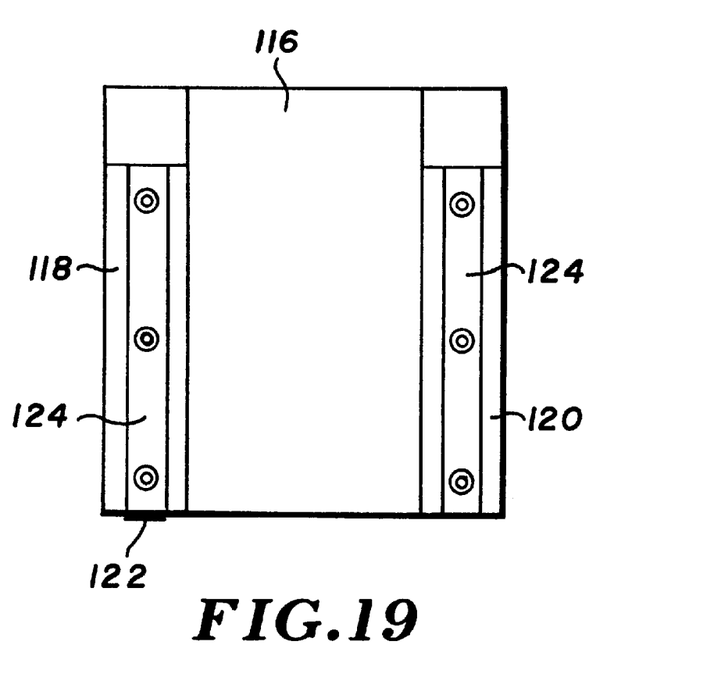
FIG. 19 shows a further alternative embodiment slider with texturing features formed along longitudinal metalized channels.

FIG. 19 illustrates a further alternative magnetic data transducing head slider 116 having skis 118 and 120 along opposite sides. A transducer 122 is supported near the trailing edge of ski 118. Along each ski, the ceramic substrate material has been removed to form a longitudinal channel. In each case chromium or another metal is deposited within the channel to form a metallic region 124 spanning the length of the ski. In other respects, the process is substantially the same as that previously described. As compared to the previous process, the longitudinal channel approach is simpler, but requires more metal.

Figure 20:
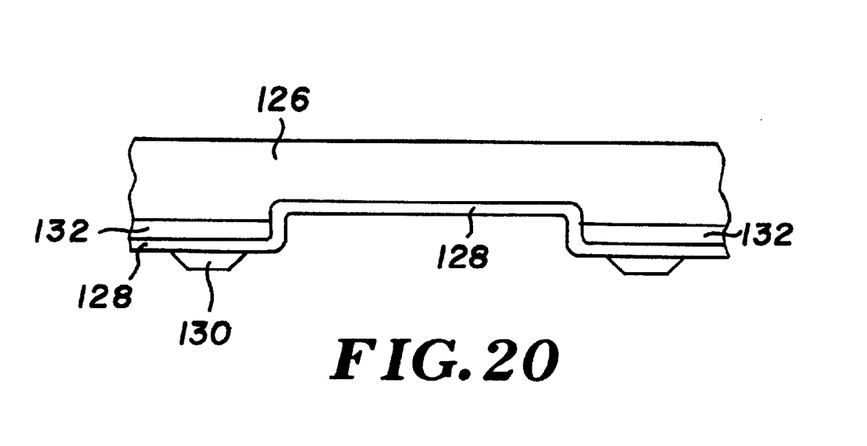
FIG. 20 shows yet another alternative embodiment slider in which texturing features are formed from a single, continuous metallic layer.

FIG. 20 illustrates yet another alternative embodiment magnetic data transducing head slider 126 in forward end elevation, revealing a metallic seed layer 128 covering the entire bottom surface of the slider, although rims 130 are formed only along skis 132.

Thus, in accordance with the present invention, the air bearing surfaces of magnetic data transducing head sliders are selectively textured, to enable contact of the sliders with smooth, specular surfaces of magnetic recording disks while at the same time counteracting stiction and maintaining acceptably low levels of dynamic friction during slider takeoffs and landings. Texturing of the slider eliminates the need for texturing media to form dedicated head contact or landing zones. This reduces media processing time, provides additional space on recording media for storing data, and increases surface uniformity of the media which leads to increased slider stability during normal operation. As the contact zone is eliminated, so is the need to guide the slider toward such zone when decelerating, and maintain the transducer over such zone during disk accelerations. The texture can incorporate a gradient to support a slider, when at rest, at an orientation that replicates the in-flight orientation of the slider.

What is claimed is:

1. A magnetic data transducing head slider, including:
a ceramic substrate body defining a generally planar air bearing surface having a nominal surface plane; and
a plurality of features formed of a heat-formable material, having projection distances by which the features are projected outwardly of the nominal surface plane, and collectively adapted to support the substrate body on a magnetic data storage medium with said air bearing surface in spaced apart relation to the data storage medium, wherein said features are rounded and substantially free of sharp edges, and each of the features has a feature diameter that exceeds its projection distance by at least a factor of ten.

2. The slider of claim 1 wherein:
said features are substantially uniform in their degree of projection beyond the nominal surface plane, and thereby cooperate to support the substrate body with the nominal surface plane parallel to the data storage medium.

3. The slider of claim 1 wherein:
said features are selectively varied in their size to form a height gradient in said features, in a selected direction across said air bearing surface.

4. The slider of claim 1 wherein:
said substrate body has a leading edge and a trailing edge and supports a magnetic data transducer along the trailing edge; and
the features are arranged to provide a gradient of increasing feature height in the direction toward the forward edge.

5. The slider of claim 3 wherein:
said features, when contacting a data storage medium, support the transducer in spaced apart relation to the data storage medium.

6. The slider of claim 3 wherein:
said features, when in contact with a data storage medium, support the slider body at a predetermined orientation selected to simulate an in-flight orientation in which an air bearing supports the slider when the data storage medium is moving relative to the slider.

7. The slider of claim 1 wherein:
said features consists essentially of at least one of the following: nodules, and annular rims.

8. The slider of claim 1 further including:
a protective cover layer covering the substrate and the features, and having an exposed surface comprising the air bearing surface.

9. The slider of claim 8 wherein:
said protective cover layer has a uniform thickness whereby the exposed surface of the cover layer tends to replicate a surface topography of the substrate and features.

10. The slider of claim 1 wherein:
said features are formed of a metal.

11. The slider of claim 10 further including:
means forming a plurality of depressions extending inwardly of said nominal surface plane, wherein said metal is deposited within said depressions.

12. The slider of claim 10 wherein:
said metal is deposited to a selected level whereby an exposed surface of the metal, with the exception of said features, is substantially coplanar with the nominal plane.

13. The slider of claim 1 wherein:
said features project outwardly from the nominal surface plane by distances in the range of about 25 to about 75 nanometers.

14. A magnetic data transducing head slider, including:
a ceramic substrate body defining a generally planar air bearing surface having a nominal surface plane, said substrate body further having a leading edge and a trailing edge and supporting a magnetic data transducer along the trailing edge; and
a plurality of features projected outwardly of the nominal surface plane and collectively adapted to support the substrate body on a magnetic data storage medium with said air bearing surface in spaced apart relation to the data storage medium, with the nominal surface plane inclined away from the data storage medium in the direction toward the forward edge.

15. The slider of claim 14 wherein:
said features, when contacting a data storage medium, support the transducer in spaced apart relation to the data storage medium.

16. The slider of claim 14 wherein:
said features, when in contact with a data storage medium, support the ceramic substrate body at a predetermined orientation corresponding to an in-flight orientation in which an air bearing supports the ceramic substrate body when the data storage medium is moving relative to the ceramic substrate body.

17. The slider of claim 14 wherein:
said features are rounded and substantially free of sharp edges.

18. The slider of claim 14 wherein:
said features are selectively varied in their size to form a gradient of increasing feature height in the direction toward the forward edge.

19. The slider of claim 14 wherein:
said features are disposed in a plurality of depressions formed in the substrate body, and a degree of incline of the nominal surface plane is determined by a variance in the extent to which each feature is recessed into its associated one of the depressions.

20. The slider of claim 14 further including:
a protective cover layer covering the substrate and the features, and having an exposed surface comprising the air bearing surface.

21. The slider of claim 14 wherein:

said features are formed of a metal.

22. A magnetic data transducing head slider, including:

a ceramic substrate body defining a generally planar air bearing surface having a nominal surface plane, and a plurality of depressions extending inwardly of the nominal surface plane; and a heat-formable material occupying said depressions and forming a plurality of features projected outwardly of the nominal surface plane, said features being collectively adapted to support the substrate body on a magnetic data storage medium with said air bearing surface in spaced apart relation to the data storage medium.

23. The slider of claim 22 wherein:

said features are rounded and substantially free of sharp edges.

24. The slider of claim 22 wherein:

said features are substantially uniform in their degree of projection beyond the nominal surface plane, and thereby cooperate to support the substrate body with the nominal surface plane parallel to the data storage medium.

25. The slider of claim 22 wherein:

said substrate body has a leading edge and a trailing edge, and supports a magnetic data transducer along the trailing edge; and the features are arranged to provide an incline in the nominal surface plane away from the data storage medium in the direction toward the forward edge.

26. The slider of claim 25 wherein:

said features are selectively varied in their size to form a height gradient in the features in the direction toward the forward edge.

27. The slider of claim 25 wherein:

said incline of the nominal surface plane is due substantially to a decrease in a depth of the depressions in the direction toward the forward edge.

28. The slider of claim 22 further including:

a protective cover layer covering the substrate and the features, and having an exposed surface comprising the air bearing surface.

29. The slider of claim 22 wherein:

said heat-formable material is a metal.

30. The slider of claim 29 wherein:

said metal is selected from the group consisting of: chromium, molybdenum, tungsten, copper, NiFe alloys, and combinations thereof.

31. A magnetic data transducing head slider, including:

a ceramic substrate body defining a generally planar air bearing surface having a nominal surface plane; and a plurality of features projected outwardly of the nominal surface plane by respective projection distances and collectively adapted to support the substrate body on a magnetic data storage medium with said air bearing surface in spaced apart relation to the data storage medium, said features being spaced apart by spacing distances that exceed the projection distances by at least a factor of ten.

32. The slider of claim 31 wherein:

said features consist essentially of the annular rims.

33. A magnetic disk drive, including:

a magnetic disk rotatable about an axis; and a ceramic transducing head substrate body defining a generally planar air bearing surface having a nominal surface plane, and a plurality of features formed of a heat-formable material projected outwardly of the nominal surface plane by respective projection distances and collectively adapted to support the substrate body on the magnetic disk with said air bearing surface in spaced apart relation to the disk, wherein said features are rounded and substantially free of sharp edges;

a magnetic transducer mounted on the ceramic substrate body; and a means for supporting the ceramic substrate body in spaced apart relation to the magnetic disk with said features projected toward a recording surface of the magnetic disk, and for generally radial movement with respect to the disk;

wherein the recording surface, throughout an area confronted by the ceramic substrate body over said generally radial movement, has a surface roughness less than said projection distances.

34. The magnetic disk drive of claim 33 wherein:

said recording surface, throughout an area confronted by the ceramic substrate body over said generally radial movement, has a surface roughness of at most about 5 nm.

\* \* \* \* \*